(12) United States Patent
O'Sullivan et al.

(10) Patent No.: US 9,235,815 B2
(45) Date of Patent: Jan. 12, 2016

(54) NAME RESOLUTION (75) Inventors: Patrick O'Sullivan, Dublin (IE); Fred Raguillat, County Meath (IE); Edith H. Stern, Yorktown Heights, NY (US); Barry E. Willner, Braircliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 508 days.

(21) Appl. No.: 13/164,214

(22) Filed: Jun. 20, 2011

(65) Prior Publication Data

US 2012/0324020 A1   Dec. 20, 2012

(51) Int. Cl.
*G06F 15/16* (2006.01)
*G06Q 10/00* (2012.01)
*H04L 12/58* (2006.01)
*H04L 29/12* (2006.01)

(52) U.S. Cl.
CPC .............. *G06Q 10/00* (2013.01); *H04L 51/063* (2013.01); *H04L 51/28* (2013.01); *H04L 61/1547* (2013.01); *H04L 61/305* (2013.01); *H04L 61/3065* (2013.01); *H04L 51/08* (2013.01)

(58) Field of Classification Search
CPC ..... G06Q 10/107; H04L 12/585; H04L 12/58
See application file for complete search history.

(56) References Cited

U.S. PATENT DOCUMENTS

| 7,567,936 | B1 | 7/2009 | Peckover et al. |
| 7,831,668 | B2 | 11/2010 | Deeds |
| 2003/0233329 | A1* | 12/2003 | Laraki et al. ............... 705/52 |
| 2004/0203619 | A1 | 10/2004 | Tissot |
| 2005/0071440 | A1* | 3/2005 | Jones et al. ............... 709/218 |
| 2006/0229058 | A1* | 10/2006 | Rosenberg ............. 455/404.2 |
| 2008/0005341 | A1* | 1/2008 | Subbian .................. 709/229 |
| 2008/0052364 | A1 | 2/2008 | Zhou |
| 2009/0106383 | A1 | 4/2009 | Liang et al. |
| 2009/0144626 | A1 | 6/2009 | Appelman |
| 2009/0170538 | A1* | 7/2009 | Shrivathsan et al. ....... 455/466 |
| 2010/0211890 | A1 | 8/2010 | Cragun |
| 2010/0257222 | A1* | 10/2010 | Hamilton et al. ........ 709/202 |
| 2010/0318614 | A1 | 12/2010 | Sager |
| 2012/0135744 | A1* | 5/2012 | Curtis et al. ............ 455/456.1 |
| 2012/0323959 | A1 | 12/2012 | O'Sullivan |
| 2012/0323960 | A1* | 12/2012 | Gamaley et al. ......... 707/769 |

* cited by examiner

*Primary Examiner* — Philip Chea
*Assistant Examiner* — Van Kim T Nguyen
(74) *Attorney, Agent, or Firm* — Moore & Van Allen PLLC (57) ABSTRACT

A method, device and computer program product for name resolution in a collaborative environment may include receiving initiation of a collaboration from a user, where the collaboration includes actions from at least two applications. The method may also include determining an identity of the user initiating the collaboration. The method may further include retrieving an alias of the user and attaching the alias of the user to the collaboration.

21 Claims, 5 Drawing Sheets

NAME RESOLUTION

BACKGROUND

As a result of globalization, many small, medium and large companies now have an employee presence across multiple geographies. These companies have presence in USA, Europe, India, China, Japan, and other locations. For a company to be successful, these geographies need to be able to successfully interact in many collaborative ways. However, there are many difficulties with this. For example, individuals in China and Japan struggle to understand, remember, use and/or relate to European and U.S. names. Likewise, individuals in USA or Europe, for example, may struggle for the same reasons.

To circumvent this challenge, individuals in China and Japan may verbally go by a U.S. style name. For example, one person named "Mao Se Tung/China/CompanyA" goes by Robin. Another person named "Yao Ming/China/CompanyB" goes by Tina. Unfortunately, some systems, like email, instant messaging, social software, phone systems, blogs, wikis, team rooms, etc., are not designed to cope with such things as application name-aliasing and resolution. As such, users of such software who want to relate to Robin or Tina have to first extract the real name, use this as a basis to start a conversation or email or add/find a buddy, and then interact with these individuals based on their preferred alias or pseudo-name.

Currently, there is no solution that solves the broader class of problem when considering the plurality of applications that individuals use, and when these applications collide in an aggregated social workflow that encapsulates multiple applications. Likewise, there is no solution to owner-based aliasing that propagates across applications to observers. Further, there is no solution to observer-based aliasing that propagates across applications. Yet further, there is no solution to an organizational policy system that can assist in the differential management of an individual's name (e.g. one user known as Robin in Europe, Mao Se Tung in China, Chong in Japan, and so on.).

BRIEF SUMMARY

According to one aspect of the present invention, a method, device and computer program product for name resolution in a collaborative environment may include receiving initiation of an email communication from a user. The method may also include determining an identity of the user initiating the email communication. The method may further include retrieving an alias of the user (either at the initiation phase or at the back end phase) and attaching the alias of the user to the email communication. The email communication (including the alias) may then be completed to an intended recipient so that the intended recipient sees the alias on the email communication.

According to another aspect of the present invention, a device for name resolution in a collaborative environment may include a processor and a memory associated with the processor. The processor may be configured for receiving a creation of an artifact from a creator. The artifact may be a file or content that is created or modified and eventually be uploaded to a network. The processor may be further configured for determining an identity of the creator creating the artifact for upload, retrieving an alias of the creator, and attaching the alias of the creator to the artifact.

According to a further aspect of the present invention, a computer program product for name resolution in a collaborative environment may include a computer readable storage medium having computer readable program code embodied therewith. The computer readable program code may include computer readable program code configured for receiving, at a server, initiation of an electronic communication from a user, wherein the electronic communication is intended for a recipient. The computer readable program code may further include computer readable program code configured for determining an identity of the user initiating the electronic communication. The computer readable program code may further include computer readable program code configured for retrieving an alias of the user, and computer readable program code configured for attaching the alias of the user to the electronic communication.

BRIEF DESCRIPTION OF THE SEVERAL VIEWS OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, a class may define an abstract characteristic of a thing or object, such as a group of code or instructions for performing a particular operation or function. The abstract characteristics may include characteristics of the thing or object, for example attributes, fields or properties, behaviors, such as functions or methods that can be performed by the class. An object is a particular instance of a class. The set of values of the attributes of a particular object is the state of the object. The object includes the state and the behavior that is defined in the object's class. A method is an object's abilities or functions the object can perform.

In accordance with an aspect of the invention, solutions for name resolution are disclosed and will now be generally introduced. Embodiments of the name resolution invention relates to the following: (1) a method to record both alias name and real name in any form of correspondence; (2) a method to facilitate auto-substitution of the real name with the alias; (3) a method that recognizes a name used in an application. (e.g. Twitter feed, Lotus Connections Profiles, Lotus Notes—email field, etc.); (4) a method to resolve said name to a personally identifiable name. (e.g. in email, a Chinese employee named Mao Se Tung may refer to herself as Robin); (4) a method to identify the person accessing the application, and present a name specific to a person, metadata or attribute accessing said application, such as when Mao Se Tung speaks to another co-worker, she may use Mao Se Tung or Robin based on her relationship with the co-worker and where the co-worker is located. (5) a method to extract all name variants from an alias; (6) a system to implement a policy system in which a user's identity is never known or released for security reasons, e.g. a person (for all social and collaborative applications) resolves a user to a central alias; and (7) a system to adjust or direct which name is used based on parameters, sites and destinations. The system may also be enabled at the individual or corporate identity level.

A general summary of some aspects of the invention will now be discussed. When considering information technology ("IT") and social and collaboration applications, the identity that an individual has surfaces in many places—one's email, one's Lotus Sametime client, one's intranet client, one's office phone, applications that one uses and contributes to where their name is surfaced as an author, editor, reviewer, etc. The ability for an individual (observer) to reconcile a single name here in these instances is very useful (i.e. any time the name "Mao Se Tung/China/CompanyA" surfaces in any of these applications the automatic substitution of "Robin" happens). Likewise, the ability for an individual (name owner) to reconcile an alias should also be useful—such that owner's preferred alias can propagate. As mentioned, in the owner use case the alias used is observer-locale sensitive so that Mao Se Tung/China/CompanyA is known as Robin in Europe, Xo in China, Chong in Japan, and so on. Likewise, when considering applications inside and outside of a company, individuals can typically have multiple identities. For example, one's identity in ABC Company resolves to an LDAP entry "employee brian@ie.companyABC.com", on g-mail it is "brian-abc@gmail.com", on eBay it is "brian-abc-company", and so on. Interactions are motivated across these email addresses, and oftentimes individuals that we interact with have to cope with multiple identities (e.g. colleagues at work email and employees using their company ID, when they leave the office they use their AOL or Google ID, on twitter they use yet another ID, and so on). This creates confusion, problems with identity reconciliation, and when crossing locales it results in a complete inability to relate the individual to a person that one knows or should know. Therefore, the ability for the recipient to see one name for the plurality of names that the sender has is very useful. Likewise, the ability for the sender to motivate a common name that is shared with the sender for this plurality of names (respecting locale/geographic specific aliases) is a also useful. In another embodiment, the name-owner can set preferences for how he/she is known across all applications. This means that "Mao Se Tung" can become Robin in Europe, Xo in China, Chong in Japan, and so on.

In a secondary embodiment, from the perspective of the observer, any time a name surfaces in any place (mail, Lotus sametime client, phone id, document library, wiki, blog, etc.), the alias of that person can be configured for the observer to see what they wish. In all of these places an end user or recipient of a collaboration can then see that "Mao Se Tung" becomes "Robin" or "Robin (Tech Lead, Company ABC Team Leader)", or default to what the name-owner has proposed for that reason. According to some embodiments, the present invention may include an identity management policy system for both an individual and a corporate. In the individual/client side embodiments, the individual user can specify an alias for an individual which, when used, will record both the alias and real name and in any form of correspondence will allow this user to use said alias and facilitate auto-substitution of the real name, thereby allowing the user to only worry about remembering and using the alias. In the server side embodiments, an individual can specify their preferred name/alias and all software assets will subsequently respect this through substitution of the alias when said name appears on an email or buddy list etc., as well as allowing a third party user to refer to this person via this alias and have the various software applications respect this (i.e. resolve the correct name correctly but not worry the end user about this as he/she can simply use the alias). In situations where multiple aliases exist that resolve to the same name, then proximity (e.g., I have chatted with this person recently so this is the name Robin should resolve to as opposed to that other Robin that I never talk to). This can be an alias that Robin defines, or an alias that the observer defines. If it is an alias that Robin, defines then the world benefits from this knowledge. If it is an alias that the observer defines then the applications that the end user uses adjusts accordingly, just for the end user. Significantly, this solution also solves the problem of name collision—e.g. the note that one wants to send to "John Smith" in Ireland that one sends to "John Smith" in Holland inadvertently. The solution works across locales. For example, Mao Se Tung is configured as Robin in Europe, Xo in China, Chong in Japan, and so on. In an IM chat, email, wiki, blog, phone call or web conference, a European employee will see "Robin", and a Japanese employee will see Chong and a Chinese employee will see the Chinese variant of Xo. When Robin sends an IM to a peer in Japan the IM will arrive with the Japanese alias (i.e., Chong). If this is forwarded or if a European employee is added to the chat, then they see the European preferred name (i.e., Robin). Likewise, in one embodiment, an individual can right click on a name and extract the real name and all locale variants should this information be required. This embodiment also solves the problem of multiple name resolution. For example, we see that on Company ABC's intranet that there are 13 hits for "John Doe", 7 hits for "Chris Smith", 9 hits for "Mao Xo" and so on. Embodiments of the present invention eliminates the problem of addressing using proximity rules. For example, if "Mao Se Tung" is a member of a user's team, then the user will simply send an IM to "Robin" or an email to "Robin" or a phone call to "Robin" and the possibility of surfacing the incorrect "Mao Se Tung" is completely eliminated. Significantly, embodiments of the present invention also permits a company to implement a policy system in which a user's identity is never known or released for security reasons, and that person (for all social and collaborative applications) resolves a user to a central alias.

The above concept is generally depicted in FIGS. 1-5, according to some embodiments. FIGS. 1-5 are discussed below.

Figure 1:
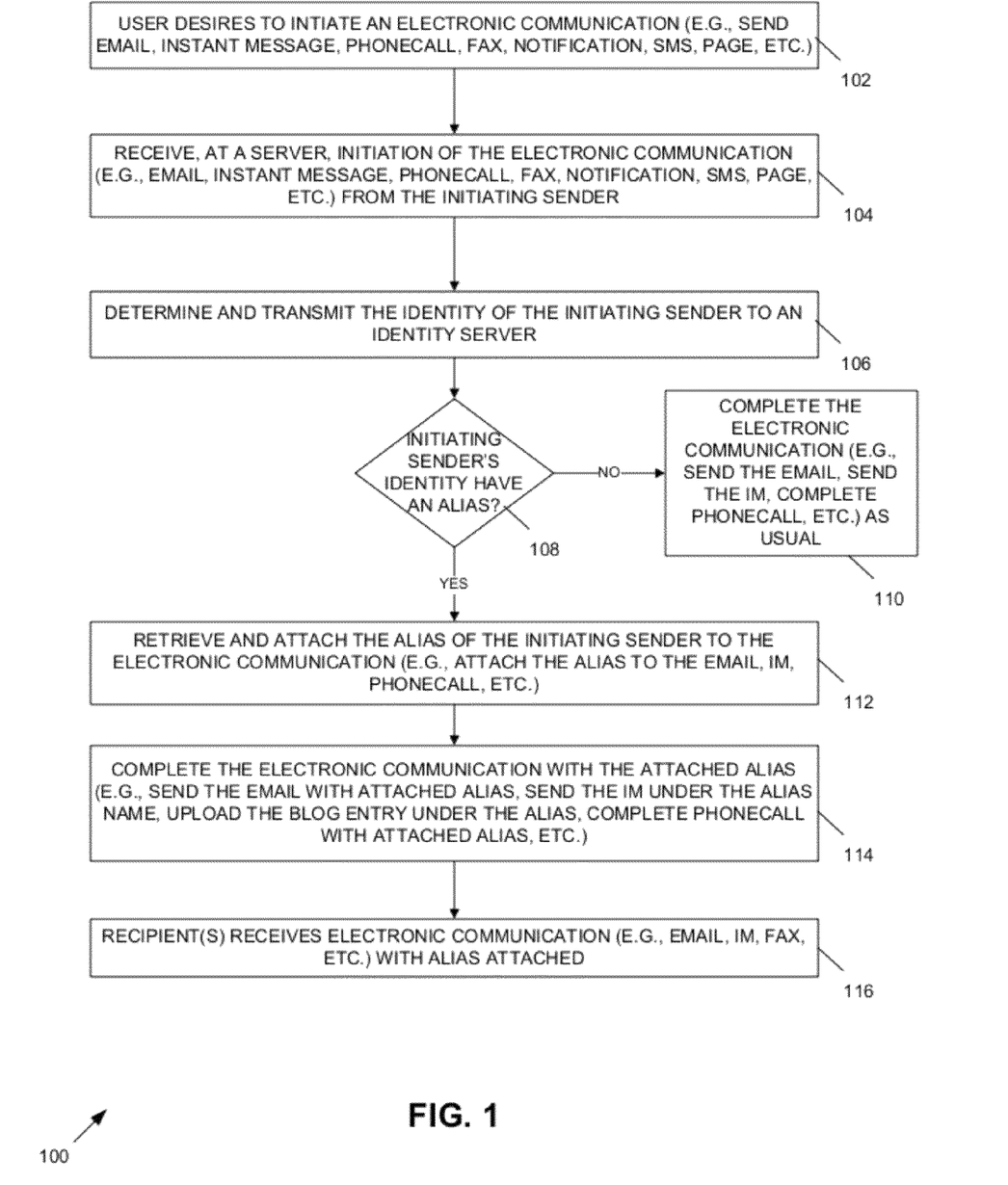
FIG. 1 is a flowchart of an example of a method for name resolution in a collaborative environment with regard to electronic communications in accordance with an embodiment of the present invention.

FIG. 1 is a flowchart of an example of a method 100 for name resolution in a collaborative environment in accordance with an embodiment of the present invention. In block 102, a user may desire to initiate an electronic communication. Such user may be referred to herein as the initiating sender or just the sender. Additionally, as used herein, an electronic communication may represent any communication that takes place between a first user and a second user (or a plurality) of individuals/users, such as email, instant message ("IM"), facsimile, phone calls, notifications, short message service ("SMS") or media messaging service ("MMS") and any other means for electronically communicating or messaging another person/computer. The sender may electronically communications with another person/computer via one or more collaborative applications. Collaboration applications may include email, instant messaging, phone calls, web conference interaction, team room interaction, document library posting, and the like. In one embodiment, the sender may initiate electronic communications using at least two of the above-mentioned collaboration applications. For example, as the initiating sender, Maggie may send an email to Mike and also send an instant message ("IM") to Mike. The sending of both an email and an IM (i.e., using multiple collaboration applications) to Mike constitutes an electronic communications via collaboration applications.

It should be noted that the present system and methods, according to another aspect, may also embody a user sending using a single collaborative application to send a single electronic communication (e.g., a user only sending an email), as the present disclosure should not be limited to the sender having to use more than one collaborative application.

In block 104, the electronic communication may be received at a server from the initiating sender. Thus, blocks 104-112 of method 100 occurs at the point of initiation by the user. As mentioned above, the electronic communication could be initiated by the sender composing an email, IM, or by other means for communicating with a user. At the point of receipt of the initiation, a server receives such electronic communication initiation prior to the server sending the electronic communication to the recipient's server and/or to the recipient. For instance, in continuing the above example, when Maggie initiates the electronic communication to Mike, the electronic communication (e.g., email, IM, fax, etc.) may be sent or initiated from Maggie's computer to the receiving server for initial processing prior to sending to the recipient or to the server/computer associated with the recipient. It should be noted that a server need not be required in this process as any computer can perform the method steps of method 100.

In block 106, the identity of the initiating sender is determined and is transmitted to an identity server. The initiating sender has an identity, such as the initiating sender's real name, email address, IP address, or some other name which is not an assigned alias to the user. For example, Maggie may send an email and the identity of Maggie is Chong Xo, which is Maggie's real name.

The identity server may be a server which has stored various aliases for various identities. Additionally, such aliases may be associated with an intended geographic area or for a group of predefined recipients. For example, the identity server may have stored an alias for Chong Xo as Maggie for any electronic communications sent to recipients located in or associated with the United States. This allows Chong Xo's electronic communications to be labeled with her alias, "Maggie," when she sends any electronic communications to users in or from the U.S. Other aliases for Chong Xo may also be stored at the identity server, such as Magdelina for communications Chong Xo sends to recipients in Spain.

Regardless, in block 108, the identity server, upon receipt of a electronic communication, may look up the identity of the initiating sender to determine if any aliases exist for such initiating sender. If not, the method 100 may continue to block 110 where the electronic communication may be completed or sent as usual (e.g., in the case of the electronic communication being an email, the email is sent from the receiving server to the recipient's mail server which will then forward the email to the recipient's personal computer for viewing).

If, however, any aliases do exist for the initiating sender, the method may continue to block 112. It should be noted that, in order for the method 100 to continue to block 112, the identity server may also perform one or more conditional filters, such as if the aliases are only for a predefined recipient group or predefined geographical area. If there is an alias that is associated for the initiating sender and the alias meets the conditional filter criteria (if any), then the method may continue to block 112, according to some embodiments.

In block 112, the alias(es) of the initiating sender is (are) retrieved and may be automatically attached to the collaboration so that the alias(es) may be associated with the initiating sender's electronic communications in response to the system determining that alias(es) do exist for the sender. For example, an alias may be attached to the email address of the initiating sender's email address (e.g., <Maggie> chong.xo@gmail.com), the initiating sender's IM (e.g., <Maggie> @chongxo.instantmessage, etc.), the sender's phone number (e.g., <Maggie> 555-123-5555) and or any other electronic communications.

In block 114, after any aliases have been attached to the electronic communication, the electronic communication may then be completed so that the electronic communication is sent/completed with the attached alias. The electronic communication is sent from the initiating sender's server to the recipient's server, where the electronic communication can then be forwarded to the recipient's computer.

In block 116, the end user(s) receives the electronic communication from the recipient's server, which may be separate from the initiation server discussed above. The end user receives the alias attached to the electronic communication and immediately identifies the alias with the initiating sender. It should be noted that the alias may be sent to the recipient with or without the initiating sender's real identity.

Figure 2:
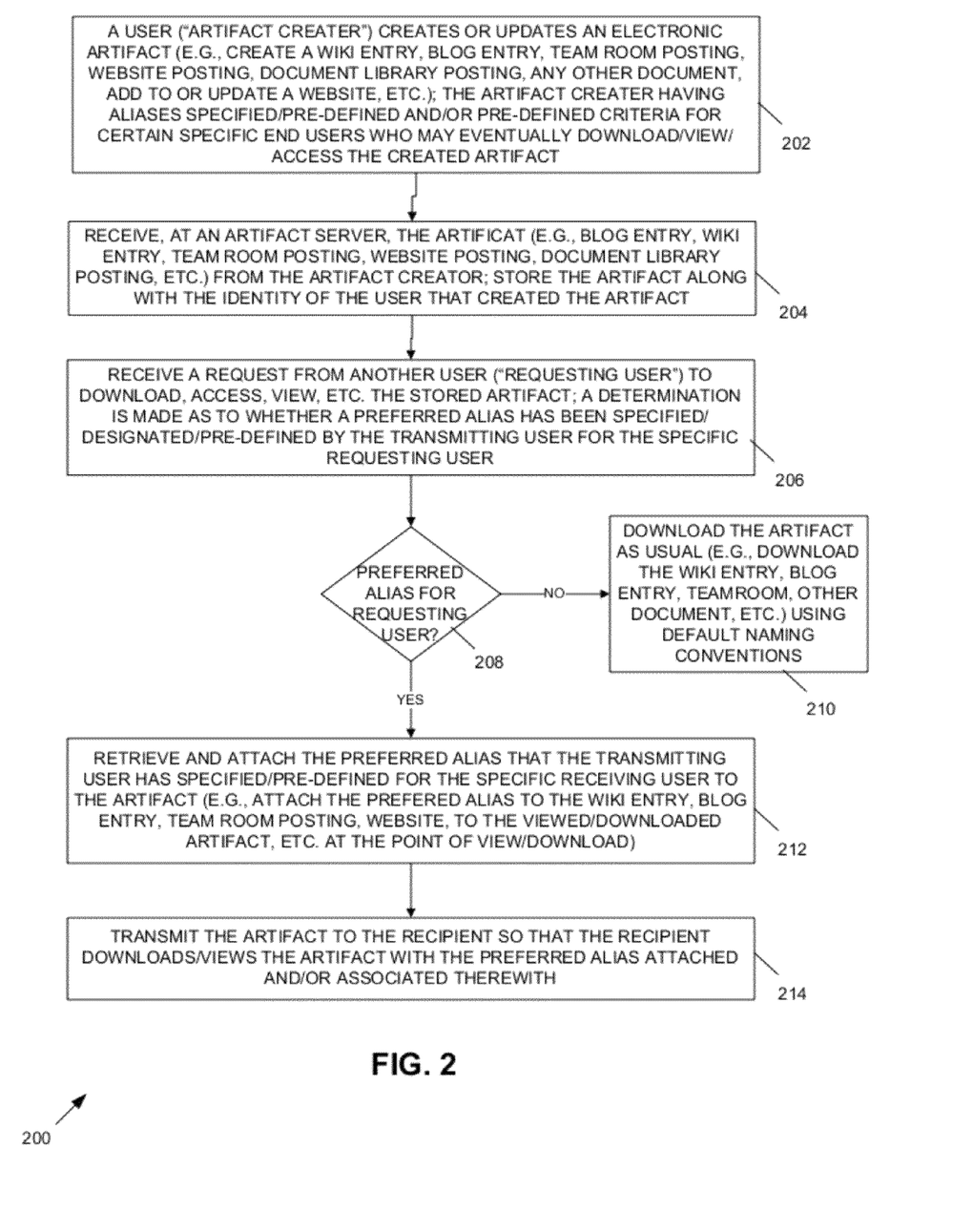
FIG. 2 is a flowchart of an example of a method for name resolution in a collaborative environment with regard to uploading/downloading artifacts in accordance with another embodiment of the present invention.

FIG. 2 is a flowchart of an example of a method 200 for name resolution in a collaborative environment with regard to uploading/downloading artifacts in accordance with an embodiment of the present invention. In block 202, a user creates and/or updates an electronic artifact. As used herein, according to some aspects, an artifact may be any updating, managing or creating of a document, a file, website content, etc., such as creating/updating a wiki entry, creating/updating a blog entry, team room postings, document library posting, creating a document, adding or updating content on a website on a LAN or WAN, or any other method to electronically communicate via updating or creating content. The artifact creator may have pre-defined criteria for certain specific end users (referred later as "requesting users") who may eventually download/view/access the created artifact. The pre-defined criteria may be aliases are specified for users in geographical locations, users which speak certain languages, users from a specific country, or any other criteria that the artifact creator wishes to use to pre-define which alias may be associated with which end user.

In block 204, the artifact may be received at an artifact server from the artifact creator. The artifact is then stored at the artifact server so as to allow an end user to later view and/or access the artifact. The artifact is stored along with the identity of the user that created the artifact. In one embodiment, the identity may be the actual name of the artifact creator. It should be noted that the identity should not be limited to just the actual name of the artifact creator and the identity may include other information, such as the alias of the artifact creator, in an embodiment.

In block 206, a request from an end user is received requesting to download, view, access, etc. the stored artifact. This request may be sent from a computer or server associated with the end user and is transmitted to the artifact server. A determination may then be made as to whether a preferred alias has been specified or pre-defined by the artifact creator for the specific requesting user (blocks 206-208). For example, a determination may be made as to whether the alias creator has specified a preferred alias for Jim Smith, a requesting end user who wishes to view the artifact, and assuming the artifact creator has created a preferred alias of "Jamie" for Jim Smith, then the method will indicate that a preferred alias for Jim Smith does indeed exist.

If the method 200 determines the artifact creator or the requested artifact does have at least one preferred alias specified or pre-defined for the requesting user, the method continues to block 212, which is discussed below. However, if the method 200 determines the artifact creator or requested artifact does not have any aliases, then the method 200 may proceed to block 210 where the artifact is uploaded and processed as usual.

In block 212, any aliases associated for the requesting user with respect to the artifact and/or the artifact creator may be retrieved and attached to the artifact in any way. For example, the artifact may be signed by the alias of the artifact creator, the metadata of the artifact may include the alias of the artifact creator, the information associated with the artifact may include the alias of the artifact creator, or some other method to indicate that the artifact was created/updated by the creator using the alias. In some aspects, the alias can be included along with other aliases of the creator and/or with the creator's real name. For example, the artifact can be created by Chong Xo whose three aliases (e.g., Maggie, Magdelina, and Maria) are then associated therewith. In some embodiments, the alias is associated with the artifact at the server when the artifact is created so that the artifact is stored with the alias(es).

In block 214, the artifact may be downloaded via the artifact server along with the associated alias(es). For example, if the artifact is uploaded to a server by Chong Xo who has three aliases (e.g., Maggie, Magdelina, and Maria), the artifact can be labeled as "created/updated by Maggie, Magdelina, and Maria (Chong Xo)." In another embodiment, the downloading server can provide an indication as to the geographical location of the download server (e.g., U.S.) and only download the alias associated with such recipient's download location. For example, if the artifact is uploaded to a server by Chong Xo who has a U.S. preferred alias of Maggie and a Spain alias of Magdelina and the artifact is downloaded in U.S. (or by a U.S. user), the artifact can be labeled as "created/updated by Maggie (Chong Xo)," while if the artifact is downloaded in Spain (or by a Spanish user), the artifact can be labeled as "created/updated by Magdelina (Chong Xo)."

Figure 3:
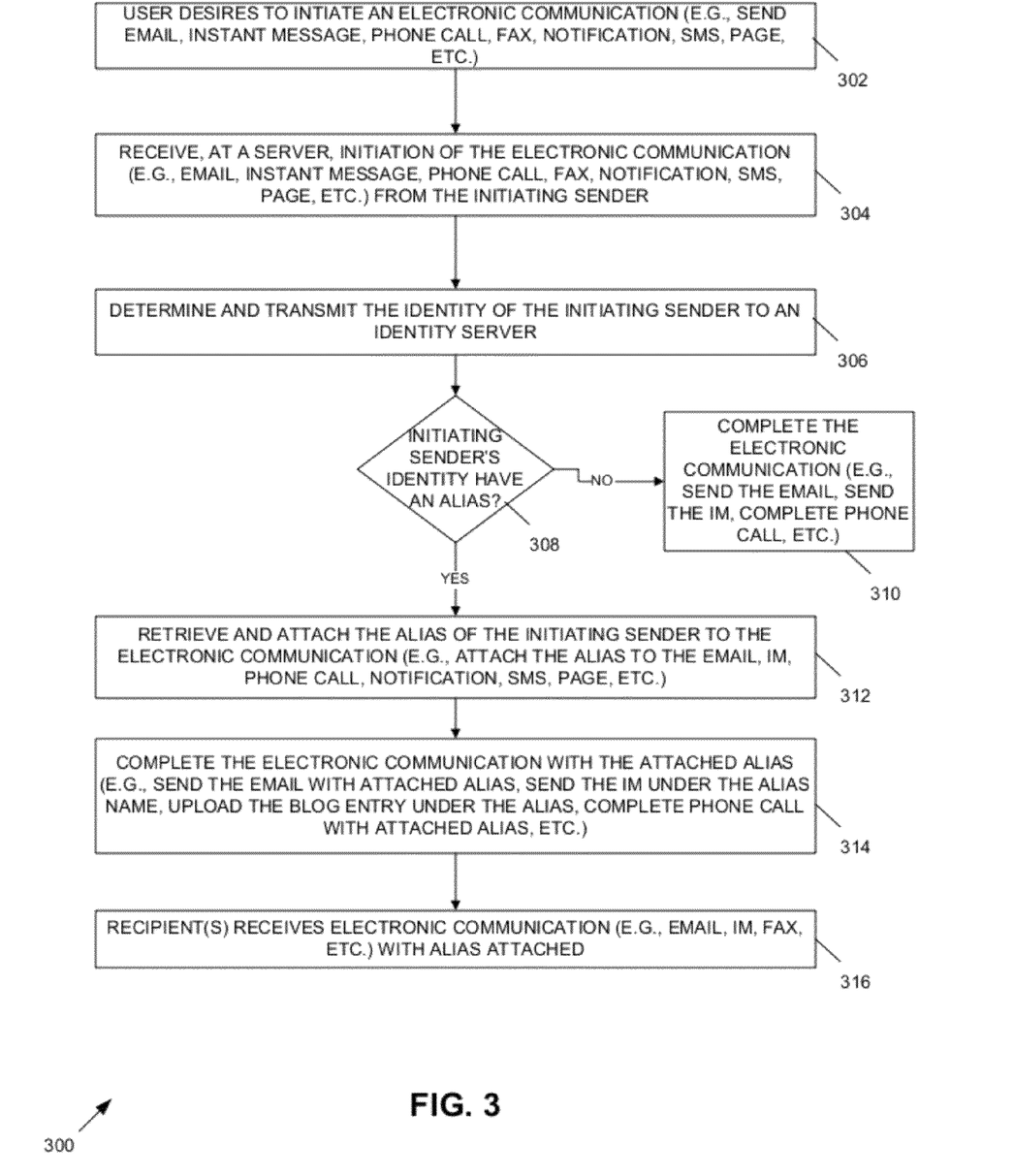
FIG. 3 is a flowchart of another example of a method for name resolution in a collaborative environment with regard to electronic communications in accordance with another embodiment of the present invention.

FIG. 3 is a flowchart of an example of another method 300 for name resolution in a collaborative environment in accordance with another embodiment of the present invention. While methods 100-200 relates to attaching the alias at the point of initiation (i.e., at the initiation phase) of the electronic communication or artifact, methods 300-400 relate to attaching the alias at the point of receipt of the electronic communication or artifact at the server (i.e., at the recipient end).

Like block 102 of FIG. 1, in block 302 of FIG. 3, a user may desire to initiate an electronic communication. As stated above, the electronic communication may be any communication in electronic form, such as e-mail, IM, fax, web conference, phone calls, and the like. In block 304, an initiation of the electronic communication is initiated from a computer of the initiating sender to an initiation server prior to the server sending the electronic communication to the recipient's server.

In block 306, the electronic communication is sent from the initiation server to a recipient's server. At this point, processing may occur at the server or computer associated with the recipient, such as the recipient's email server, the recipient's personal computer, the recipient's IM server, the recipient's phone server/computer, or any other computer or server with direct connection to the recipient. For instance, in continuing the above examples, when Maggie sends the electronic communication to Mike, the electronic communication may be sent from Maggie's computer to an initiation server for initial processing and then is sent to the recipient's server (e.g., the email server where Mike's emails are stored/managed), where the alias processing occurs.

The alias information, such as what aliases are associated with which identities, may be entered by the recipient and stored at the recipient's server. This may occur by the recipient inputting the aliases based on how the recipient knows the initiating sender. For example, if Mike wants every email from Chong Xo to say "Maggie", Mike will upload the preference that every time an electronic communication (e.g., an email, IM, phone call, etc.) is received from Chong Xo, to also attach the alias "Maggie" to such electronic communication. This information is therefore a preference set by the recipient in method 300 as opposed to the initiating sender setting these preferences as may be the case in method 100. The alias preferences/information may be entered by the recipient through a graphical user interface, which prompts the recipient the identity and alias(es) to associate with each identity. Such information may then stored at the recipient's server.

Referring back to FIG. 3, in block 308, for each intended recipient, it may be determined if the intended recipient(s) have pre-defined an alias for the initiating sender. As previously discussed, the initiating sender has an identity, such as the initiating sender's real name, email address, IP address, or some other name which is not a pre-defined alias to the user. For example, as previously presented as an example, Chong Xo is the real name, and thus the identity of the initiating sender. However, the recipient may have predefined the alias "Maggie" for Chong Xo so that any electronic communication received from Chong Xo will be presented as from "Maggie".

In block 310, a determination is made as to whether any alias is pre-defined for the initiating sender. In order to make such determination a server associated with the recipient will query a database containing stored aliases for various identities. If not, the method 300 may continue to block 310 where the electronic communication may be completed as usual. If, however, any aliases do exist for the initiating sender, the method may continue to block 312.

In block 312, the alias(es) of the initiating sender is retrieved and attached to the electronic communication so that the alias is associated with the initiating sender's electronic communication. For example, the alias may be attached to the email address of the initiating sender's email address (e.g., <Maggie> chong.xo@gmail.com), the initiating sender's IM (e.g., <Maggie> @chongxo.instantmessage, etc.), and/or any other electronic communication applications.

In block 314, after any aliases have been attached to the electronic communication, the electronic communication may then be completed so that the electronic communication is sent/completed with the attached alias. The electronic communication is sent from the recipient's server to the recipient's computer with the associated alias.

In block 316, the end user(s) receives the electronic communication from the recipient's server. The recipient or end user may receive the alias attached to the electronic communication and immediately identifies the alias with the initiating sender. It should be noted that the alias can be sent to the recipient with or without the initiating sender's real identity.

Figure 4:
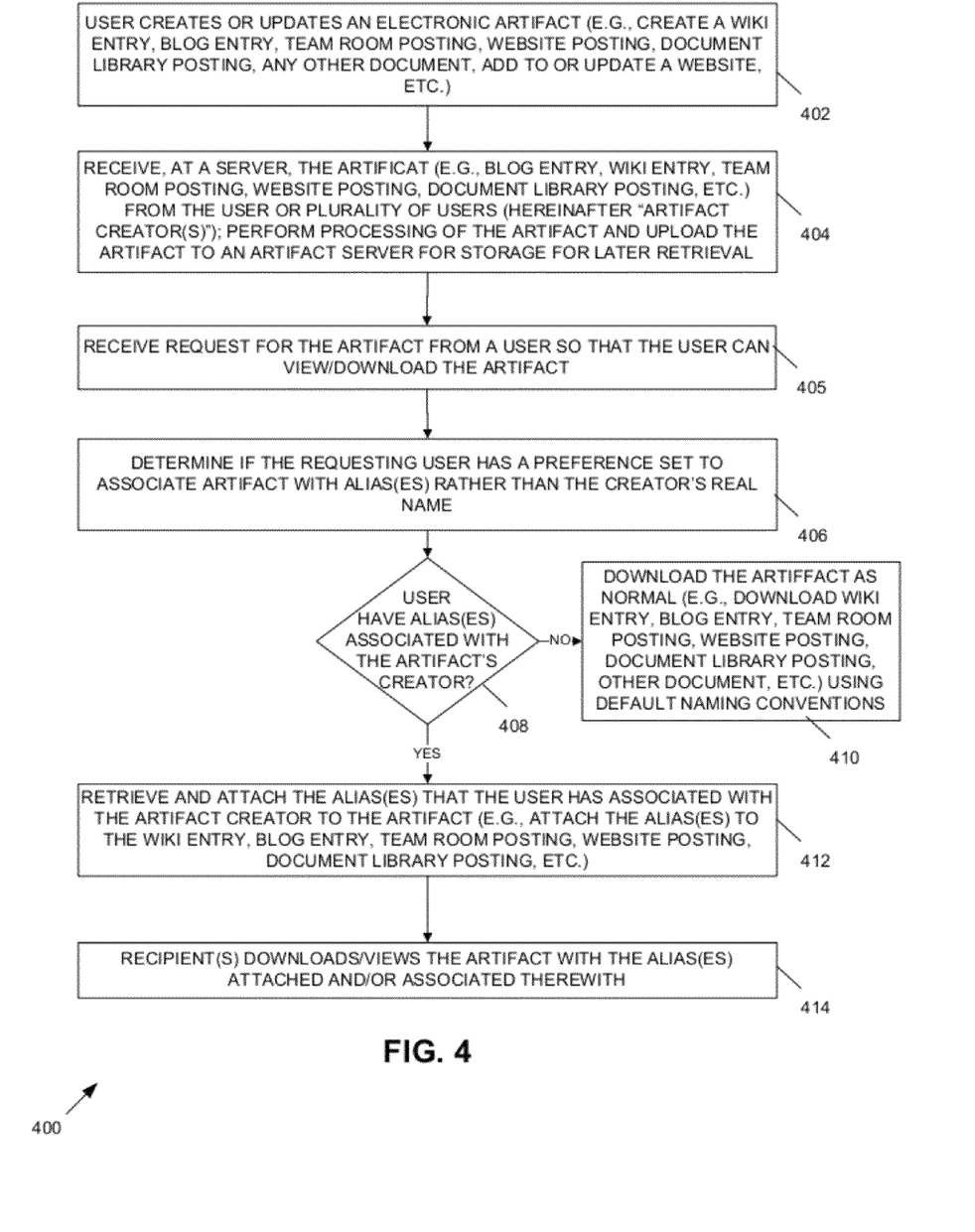
FIG. 4 is a flowchart of another example of a method for name resolution in a collaborative environment with regard to uploading/downloading artifacts in accordance with another embodiment of the present invention.

FIG. 4 is a flowchart of another example of a method 400 for name resolution in a collaborative environment with regard to uploading/downloading artifacts in accordance with another embodiment of the present invention.

In block 402, a user creates an electronic artifact. The artifact may be similar to that discussed above with regard to FIG. 2. In block 404, the artifact is received at an initiation server from the artifact creator. The initiation server may then process and forward the artifact to an artifact server. It is noted that, for both methods 200 and 400, the artifact server and the initiation server may be separate computers or servers or could be the same server or computer. Nonetheless, once the artifact is received at the artifact server, the artifact server may store the artifact thereon so that a user can request/view the artifact at some point in time.

In block 405, a user or other entity may request the artifact so that the requesting user can view or realize the content of the artifact in some way. The request may be sent directly from the requesting user's computer or from a server associated from the requesting user.

In block 406, a determination is made as to whether the requesting user has a preference set to associate the artifact with aliases rather than the creator's real name. The user may have various preferences that can be turned on or off depending on whether the requesting user wants to see aliases that were pre-set or pre-defined for various artifact creators. If the preferences are turned on, then the requesting user desires to view such alias and the method then may proceed to block 408.

In block 408, a determination is made as to whether the requesting user has an alias pre-defined for the artifact's creator. It should be noted that the requesting user may have an address book of sorts that stores various names with aliases so that when a name is retrieved, the alias is automatically retrieved and associated with the name of the stored identity. Nonetheless, the identity of the creator of the artifact being requested is transmitted to a database of identities pre-stored by the requesting user or other user(s) or computers. If there is a match in identities, then the determination is that an alias does exist and the method continues to block 412. However, if no match is found, the method 400 continues to block 410 where the artifact is uploaded as normal using normal naming conventions.

If the determination in block 408 is that the requesting user does have an alias stored for the creator of the specific artifact that the requesting user is requesting, then the alias is retrieved and attached to or associated with the artifact creator.

In block 414, the artifact may be downloaded to the user with the associated/attached alias so that the user can view that the artifact creator is associated with the alias.

It should be noted that any of the elements or features of methods 100, 200, 300 and/or 400 may be combined with any features or elements described in co-filed patent application having U.S. patent application Ser. No. 13/164,243, filed Jun. 20, 2011, and entitled "Multiple Electronic Identity Recognition" to Patrick O'Sullivan et al. and assigned to International Business Machines, Inc., which is incorporated herein by reference in its entirety.

Figure 5:
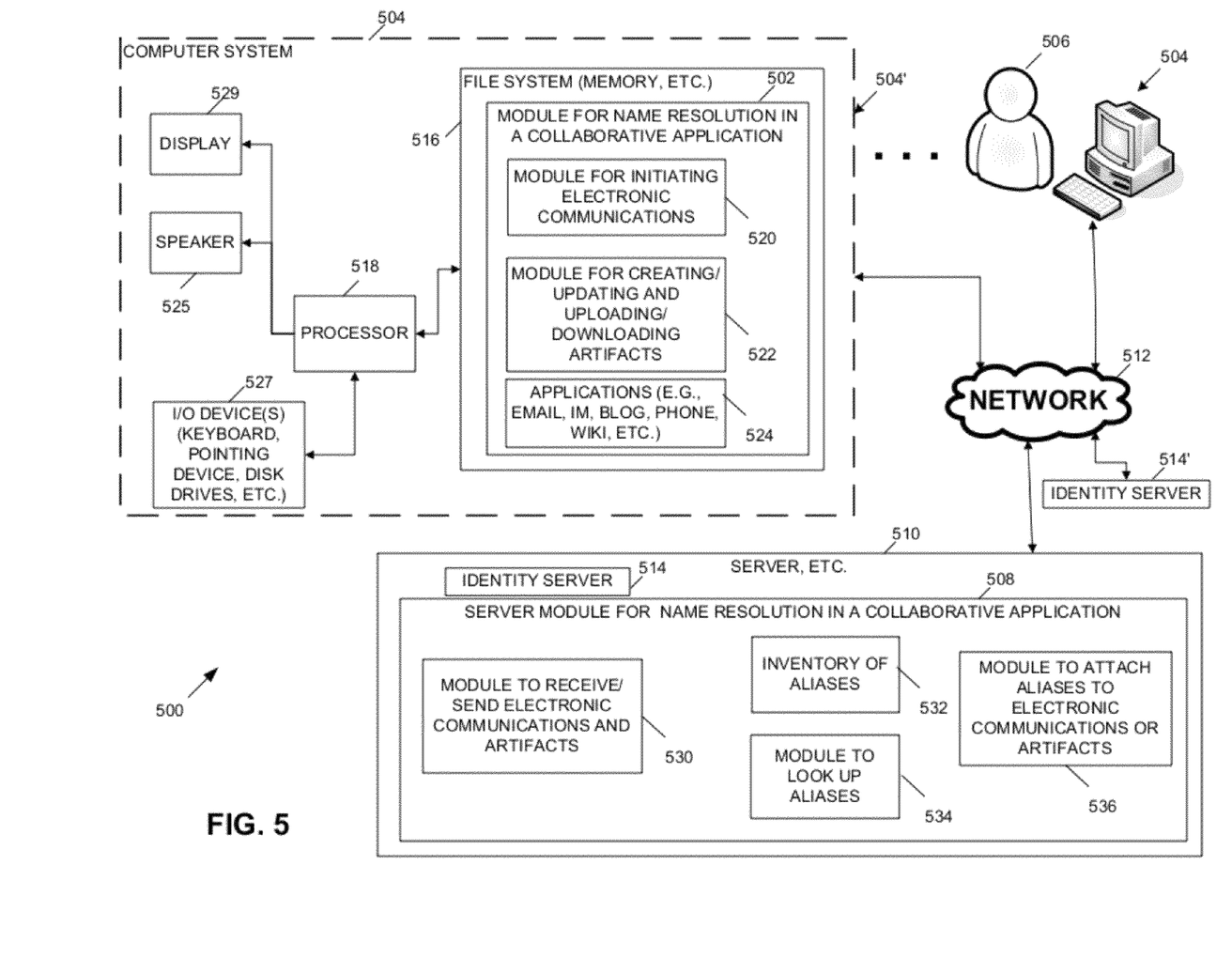
FIG. 5 is a block schematic diagram of a system of an example of a method for name resolution in a collaborative environment in accordance with an embodiment of the present invention.

FIG. 5 is a block schematic diagram of a system 500 of an example of a method for name resolution in a collaborative environment in accordance with an embodiment of the present invention. The system 500 may include a module for name resolution in a collaborative application (hereinafter "name resolution module") 502 operable on a computer system 504, or similar device of a user 506 or client. Alternatively, or in addition to the name resolution module 502 on the user's computer system 504 or client, the system 500 may include a name resolution module 508 operable on a server 510 (hereinafter "server name resolution module") and accessible by the user 506 or client 504 via a network 512. The methods 100-400 may be embodied in or performed by the name resolution module 502 and/or the server name resolution module 508. For example, the method 100 may be performed by the name resolution module 502. In another embodiment of the invention, the method 100 may be performed by the server name resolution module 508. In a further embodiment of the present invention, some of the features or functions of the methods 100 and/or 200 may be performed by the name resolution module 502 on the user's computer system 504 and other features or functions of the method 100 may be performed on the server name resolution module 508.

An identity server 514 may be operable on the server 510 or an identity server 514' may be operable separate from the server 510 and may be communicable by users 506 or participants using their respective computer systems 504 or clients. The identity server 514, 514' may be the same as previously discussed in method 100. The name resolution modules 502 and 508 may be part of the servers 510, 514, 514' or may be separate applications or modules that interface with the servers. The network 512 may be the Internet, a private network or other network. Each computer system 504' may be similar to the exemplary computer system 504 and associated components illustrated in FIG. 5.

The name resolution module 502 and/or 508 may be a self contained system with embedded logic, decision making, state based operations and other functions that may operate in conjunction with collaborative applications, such as email, IM, blogs, wikis, phone calls, web conferencing and any other application which can be used to communicate with an intended recipient and/or create/update an artifact. The self contained system may allow businesses, individuals, services, locations, and the like to interact.

The name resolution module 502 may be stored on a file system 516 or memory of the computer system 504. The name resolution module 502 may be accessed from the file system 516 and run on a processor 518 associated with the computer system 504.

The name resolution module 502 may include a module for initiating electronic communication 520 (hereinafter "initiation module"). The initiation module 520 allows the user to initiate an electronic communication using an application 524 via the computer system 504. The initiation module 520 may be accessed or activated whenever the user desires to send some communication to a recipient (e.g., emails, IM, etc.) and may call other modules such as the applications 524 or GUIs as described below. The initiation module 520 also allows input of various preferences and aliases of various recipients. The initiation module 520 may communicate with any module on the server 510 and may also communicate with the identity server 514, 514'.

The name resolution module 502 may also include a module to creating/updating and uploading and downloading artifacts 522 (hereinafter "artifact module"). The artifact module 522 allows for a user to create, update and/or manage artifacts. The artifact module 522 communicates with the server 510 to upload and/or download any requested artifact. As such, the computer 504 may act as both a requesting device and an artifact creator's device.

The user computer system 504 may also include a display 529 and a speaker 525 or speaker system. The display 529 may present applications for electronic communications and/or artifact creation/uploading/downloading/etc. and may perform controlling and display of the alias information as described herein. Any GUIs associated with the name resolution module 508 and application may also be presented on the display 529. The speaker 525 may present any voice or other auditory signals or information to the user 506.

The user computer system 504 may also include one or more input devices, output devices or combination input and output device, collectively I/O devices 527. The I/O devices 527 may include a keyboard, computer pointing device or similar means to control operation of applications and interaction features described herein. The I/O devices 527 may also include disk drives or devices for reading computer media including computer-readable or computer-operable instructions.

The server name resolution module 508 may include a module for receive/send electronic communications and artifacts 530 (hereinafter "artifacts/communications module"). The artifacts/communications module 530 may be configured to initiate, upload, download, manage, process and/or complete electronic communications and/or artifacts. The artifacts/communications module 530 is configured to communicate with any of the modules in the name resolution module 502 on the users computer 504, such as the artifact module 522, the initiation module 520 and/or the applications 524.

The server name resolution module 508 may also include an inventory of aliases 532. The inventory of aliases 532 may include one or more aliases that are associated with identities of senders/creators of electronic communications/artifacts and/or potential users thereof. The inventory of aliases 532 may be stored locally on the server 510, the identity server 514, 514', the user's computer 504 and/or the user's computer readable storage medium in a database (not shown). The inventory of aliases 532 may also be stored remotely on the network 512 in a database located on some other computer. The user 506 may add aliases to the inventory of aliases 532 at any time and/or the aliases may be automatically updated based on current communications with users.

The server name resolution module 508 may also include a module to look up aliases 534. The module to look up aliases 534 may query the inventory of aliases 532 whenever an electronic communication has been sent to or from server 510 or an artifact has been uploaded to or requested from a server, as previously described with regard to FIGS. 1-4. If a match occurs, the inventory of aliases 532 will return the alias information to the module to look up aliases 534, when then may be forwarded to the alias attachment to collaborative application module, discussed below.

The server name resolution module 508 may include a module to attach aliases to electronic communications or artifacts 536 (hereinafter "alias attachment module"). The alias attachment module 536 may attach retrieved aliases to electronic communications or artifacts, as previously discussed with regard to the description of FIGS. 1-4.

The server name resolution module 508 may further include GUIs. The server name resolution module 508 may present one or more predetermined GUIs to permit the user to define preferences and/or aliases associated with identities of end users or any other information and/or settings. The GUIs may be predetermined and/or presented in response to the user indicating the user would like to enter information and/or settings. The predetermined GUIs may be generated by the server name resolution module 508 and may be presented on the display 529 of the computer system 504.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for name resolution in a collaborative environment, comprising:

receiving, at a server, a first electronic communication generated by a first collaborative application from a user and a second electronic communication from the user generated by a second collaborative application that is different from the first collaborative application, wherein the first and second electronic communications are being sent by the user to a recipient;

determining an identity of the user sending the first and second electronic communications;

determining if a match exists between the identity of the user and an alias of the user that has been predefined by the user;

retrieving the alias of the user from a plurality of aliases stored on the server for the user based on at least a geographic area associated with the recipient of the first and second electronic communications, wherein the user has a different alias corresponding to each different geographic area of a plurality of geographic areas and wherein each different alias consists of a name predefined by the user; and attaching the alias of the user to the first and second electronic communications in response to determining the match exists between the identity of the user and the alias of the user.

2. The method of claim 1, further comprising completing the first and second electronic communications to the recipient so that the recipient receives the alias of the user upon receipt of the first and second electronic communications.

3. The method of claim 1, further comprising determining that multiple aliases are available for the user and when multiple aliases are available, determining which alias to use based on a proximity of the recipient.

4. The method of claim 1, wherein applications using the first and second electronic communications comprises software applications which allows users to electronically communicate with each other.

5. The method of claim 1, wherein the determining an identity of the user initiating the first and second electronic communications and retrieving an alias of the user occurs at a point of receipt of the electronic communications by the user.

6. The method of claim 1, wherein the determining an identity of the user initiating the first and second electronic communications and retrieving an alias of the user occurs at a point of initiation of the electronic communications by the sender.

7. The method of claim 1, further comprising retrieving information regarding the alias from another server, and storing, at an identity server, the alias information for later retrieval.

8. The method of claim 1, further comprising changing the alias to another alias in response to one of the electronic communications being send to a new recipient in a different one of the geographic areas.

9. The method of claim 1, wherein retrieving an alias comprises:
retrieving one alias in response to the recipient being within an organization; and
retrieving another alias in response to the recipient not being within the organization.

10. The method of claim 1, further comprising:
allowing the user to specify a specific alias for an individual;
recording both the specific alias and a real name of the individual, wherein the real name of the individual is automatically substituted for the specific alias in response to the user using the specific alias in communications to the individual.

11. The method of claim 10, further comprising determining a proper recipient in response to a plurality of recipients each having an alias that resolves to a same name by using proximity to select the alias corresponding to the recipient with whom the user has most recently communicated.

12. The method of claim 1, wherein attaching the alias of the user to the first and second electronic communications comprises substituting the alias of the user for another identity of the user.

13. A device for name resolution in a collaborative environment, comprising:
a processor;
a memory associated with the processor;
wherein the processor is configured for
receiving a creation of an artifact from a creator, wherein the artifact comprises a file that is created or modified which will be uploaded to a server;
determining an identity of the creator creating the artifact for upload;
determining if a match exists between the identity of the user and an alias of the user that has been predefined by the user;
retrieving the alias of the creator from a plurality of aliases stored in the memory for the creator based on at least a geographic area associated with a requestor for the artifact, wherein the creator has a different alias corresponding to each different geographic area of a plurality of geographic areas and wherein each different alias consists of a name predefined by the user; and
attaching the alias of the creator to the artifact in response to determining the match exists between the identity of the user and the alias of the user.

14. The device of claim 13, wherein the processor is further configured for uploading the artifact to one of an initiation server or an artifact server.

15. The device of claim 13, wherein the processor is further configured for receiving predefined preferences for how the creator is known by a user, wherein the user comprises an entity which downloads the artifact.

16. The device of claim 13, wherein artifact comprises a software application which allows a user to create or update a file for uploading to a network for later retrieval.

17. The device of claim 13, wherein the artifact comprises an electronic communication.

18. The device of claim 13, wherein the processor is further configured for retrieving preferences from the creator regarding an alias to attach to the artifact based on pre-defined preferences, and retrieving the alias to attach to the artifact based on the pre-defined preferences.

19. The device of claim 13, wherein the processor is further configured for:
receiving a request for the artifact from the requestor; and
downloading the artifact from an artifact server.

20. A computer program product for name resolution in a collaborative environment, the computer program product comprising:
a non-transitory computer readable storage medium having computer readable program code embodied therewith, the computer readable program code comprising:
computer readable program code configured for receiving, at a server, initiation of an electronic communication from a user, wherein the electronic communication is being sent by the user to a recipient;
computer readable program code configured for determining an identity of the user initiating the electronic communication;
computer readable program code configured for determining if a match exists between the identity of the user and an alias of the user that has been predefined by the user;
computer readable program code configured for retrieving the alias of the user from a plurality of aliases stored on the server for the user based on at least a geographic area associated with the recipient of the first and second electronic communications, wherein the user has a different alias corresponding to each different geographic area of a plurality of geographic areas and wherein each different alias consists of a name predefined by the user; and
computer readable program code configured for attaching the alias of the user to the electronic communication in response to determining the match exists between the identity of the user and the alias of the user.

21. The computer program product of claim 20, wherein electronic communication comprises a software application which allows users to electronically communicate with each other.

* * * * *